United States Patent [19]
Pastilha et al.

[11] Patent Number: 5,678,044
[45] Date of Patent: Oct. 14, 1997

[54] SYSTEM AND METHOD FOR IMPROVED REHOSTING OF SOFTWARE SYSTEMS

[75] Inventors: Mario Vieira Pastilha, Newark; William Steve Reisman, Dayton; Kevin Albert Connington, Wayne; Michael Orechoff, Somerset, all of N.J.

[73] Assignee: Electronic Data Systems Corporation, Plano, Tex.

[21] Appl. No.: 458,959

[22] Filed: Jun. 2, 1995

[51] Int. Cl.⁶ .................................................. G06F 17/30
[52] U.S. Cl. .................................... 395/615; 395/700
[58] Field of Search .............................. 395/600, 678, 395/703, 615, 700

[56] References Cited

U.S. PATENT DOCUMENTS

| | | | |
|---|---|---|---|
| 4,809,170 | 2/1989 | Leblang et al. | 395/700 |
| 4,849,880 | 7/1989 | Bhaskar et al. | 395/375 |
| 5,084,813 | 1/1992 | Ono | 395/700 |
| 5,228,137 | 7/1993 | Kleinerman et al. | 395/500 |
| 5,287,515 | 2/1994 | Murai | 395/700 |
| 5,295,222 | 3/1994 | Wadhwa et al. | 395/700 |
| 5,317,568 | 5/1994 | Bixby et al. | 370/85.6 |
| 5,367,698 | 11/1994 | Webber et al. | 395/800 |
| 5,379,430 | 1/1995 | Nguyen | 395/700 |
| 5,428,782 | 6/1995 | White | 395/650 |
| 5,495,610 | 2/1996 | Shing et al. | 395/600 |
| 5,497,463 | 3/1996 | Stein et al. | 395/200.03 |
| 5,517,622 | 5/1996 | Ivanoff et al. | 395/200.13 |
| 5,564,037 | 10/1996 | Lam | 395/488 |

*Primary Examiner*—Wayne Amsbury
*Attorney, Agent, or Firm*—L. Joy Griebenow

[57] ABSTRACT

A system and method for automated rehosting of at least one software system from a source computing environment to a predetermined target computing environment is provided. A discovery utility performs an assessment of the subject software system and its source computing environment. The discovery utility then generates a description of the software system and the source computing environment. A migration utility receives the assessment and description from the discovery utility and rehosts the software application to the target computing environment based on such assessment and description. A run-time services utility provides operational system support for the rehosted software system now within the target computing environment similar to operational system support previously available in the source computing environment based on the assessment and description.

53 Claims, 7 Drawing Sheets

SYSTEM AND METHOD FOR IMPROVED REHOSTING OF SOFTWARE SYSTEMS

BACKGROUND OF THE INVENTION

1. Field of the Invention

The present invention relates generally to computer software administration, and more particularly to a system and method for providing improved preparatory analysis and automated migration of software residing on a source computer platform environment to a target computer platform environment.

2. Description of the Related Art

As computing power and capabilities increase for mid- and low-range computers, more and more organizations are considering various down-sizing strategies. There are frequently many reasons for down-sizing. A mainframe is a costly information technology ("IT") component, especially when compared to mid-range computing platforms available today. A mid-range platform provides new options and tools that can improve operational and development efficiencies, and reduce costs. Moreover, upgrading a mainframe to support new business and growth can cost several times more than equivalent mid-range solutions.

Enterprise IT and systems may be down-sized via several strategies: reengineering, redevelopment, or rehosting. Reengineering and redevelopment are the traditional approaches selected to achieve enterprise downsizing objectives. These traditional approaches are appropriate when major changes are needed for systems to meet business objectives, particularly where current IT fails to support a business.

Rehosting, however, is becoming more often a viable strategy for moving legacy applications from a mainframe (source) to a mid-range (target) platform. Rehosting is the physical movement of one or more business applications from one computing environment, such as mainframe, to another computing environment, such as a mid-range computing platform. Applications moved from the source environment to the target environment need to be migrated while preserving all the features and functionality. After rehosting, the application needs the same "touch and feel" as it possessed in the original environment. Moreover, while it is far more common that rehosting is used for the downsizing of systems, it should be understood that rehosting may be also employed by a company which has outgrown its current source host, perhaps a personal computer, and needs to move to a mid-range or even mainframe host.

As stated above, technical advances in the computer industry over the past few years have significantly improved the performance characteristics of computers of all sizes. Many applications which formerly required mainframe processing power may now function as well and as quickly on a less costly mid-range computer. However, due to operational characteristics which tend to vary between mainframes and mid-range platforms, migration from one environment to the other has often proven to be difficult and expensive. No tools exist to aid in the evaluation of candidate application. Moreover, no tools exist to automate the actual migration process and to support the production system after migration. These factors have often ruled out rehosting (sometimes also referred to as "migration" herein) as a viable option for reducing data processing costs. Before the present invention, the some of the technology required to successfully rehost did not exist. What did exist performed poorly because components lacked many required features and such components were not integrated into a single cohesive toolset and method.

Additionally, the costs and level of manual effort required to convert data, programs, job control statements, and other system related supporting tasks and functions has severely limited the benefits to be gained through rehosting due to the (typically) unique requirements of both the source environment and most potential target environments. Specifically, either a system was manually rewritten to operate on the new targeted computing environment or "throw-away code" was written to perform the actual translation for each particular program to be migrated. Due to the disparate requirements of most computing platforms manual efforts required to migrate from a source computer to the target computer, have greatly limited the benefits to be gained by rehosting. In fact, until the present invention, rehosting was only normally used for conversion of the data and not the code, of each program. However, if the code also needed to be changed to run on the target system, normally the software was tediously and manually rewritten for the specific target system. Organizations spend thousands of extra man-hours in recreating the old application in the new environment often without the same controls and functionalities that they had been accustomed to enjoying on the previous computing environment. Moreover, much of the "rehosting" was manual manipulation (recoding) of job control language ("JCL") and execution scripts specifically written for the particular target platform.

SUMMARY OF THE INVENTION

In view of the above problems associated with the related art, it is an object of the present invention to provide a system and method for automated rehosting of a source software system to a new target computing environment.

It is another object of the present invention to provide a system and method for automated determination of whether rehosting is feasible or recommended.

It is a further object of the present invention to provide a system and method for rehosting such that the rehosted software application(s) operate with the same functionality that a user had been accustomed to enjoying in the previous computing environment.

It is a further object of the present invention to provide a single cohesive system and method for rehosting of a source software system to a new target computing environment.

The system and method of the present invention achieves these and other objects by providing a computerized tool for automating the processes necessary to successfully migrate a software system from one environment to another. Such system and method reduces time and costs associated with the migration of computer applications from the source host environment on which they currently reside, to a new targeted host environment, without the need to significantly alter the application program(s). The present invention preferably first qualifies a source software system's resources and processing requirements, and then converts/migrates all system components, including data files, job control language and programs.

In one aspect of the invention, a system and method for automated assessment of a software application for rehosting from a source computing environment to a predetermined target computing environment are provided. A computer processor having a discovery utility is used to request predetermined information from the source computing environment including the operating system, any databases in the source computing environment, as well as from the candidate software application. The discovery utility is also suited to analyze the predetermined information to assess the feasibility of rehosting the candidate software application from the source computing environment to the target computing environment. A relational database management system receives and stores the predetermined information and the results of the analysis performed by the discovery utility.

In another aspect of the invention, a system and method for automated rehosting of at least one software system from a source computing environment to a predetermined target computing environment is provided. A discovery utility performs an assessment of the subject software system and its source computing environment. The discovery utility then generates a description of the software system and the source computing environment. A migration utility receives the assessment and description from the discovery utility and rehosts the software application to the target computing environment based on such assessment and description. A run-time services utility provides operational system support for the rehosted software system now within the target computing environment similar to operational system support previously available in the source computing environment based on the assessment and description.

In yet another aspect of the invention, a system and method for automated rehosting of a software system from a source computing environment to a target computing environment is provided. A computer processor having a migration utility is used to rehost at least one job, at least one proc and at least one file of the software system to the target computing environment. The migration utility converts job control language of the source computing environment into an interim rehosting language. A run-time services utility residing on the computer processor and generates execution scripts from the interim rehosting language.

In a further aspect of the invention, a system and method for automatic file conversion for files to be migrated from a source computing platform to a target computing platform is provided. The system takes record descriptors of data in the source environment that needs to be migrated and generates conversion programs for the data that get compiled. The compiled programs are then executed against the source data, producing output files that can be ported to the target environment.

The system and method of the present invention involves a single cohesive toolset of computer programs that automates many steps necessary in the evaluation and migration of software systems from one computer operating environment to another. The invention consists of components which automatically gather the information used to evaluate candidate applications, which automatically convert software systems from their source operating environment to a new and different targeted environment, and which automatically provide services and support for the new production environment, similar to those available in the applications' former mainframe environment. These components result in a nearly, or in one embodiment a completely, automatic process for evaluating and rehosting applications without any need to significantly change or rewrite the original software systems. This is achieved by the present invention by gathering information about the software application candidate for rehosting (including the source computing environment in which it operates), converting data files and related job control statements used on virtually any source host to the corresponding formats required by a new targeted host processing environment and supporting post-migration processing to provide services similar to those formerly available in the original host computer environment.

These and other features and advantages of the invention will be apparent to those skilled in the art from the following detailed description of preferred embodiments, taken together with the accompanying drawings, in which:

DETAILED DESCRIPTION OF THE PREFERRED EMBODIMENT

Figure 1:
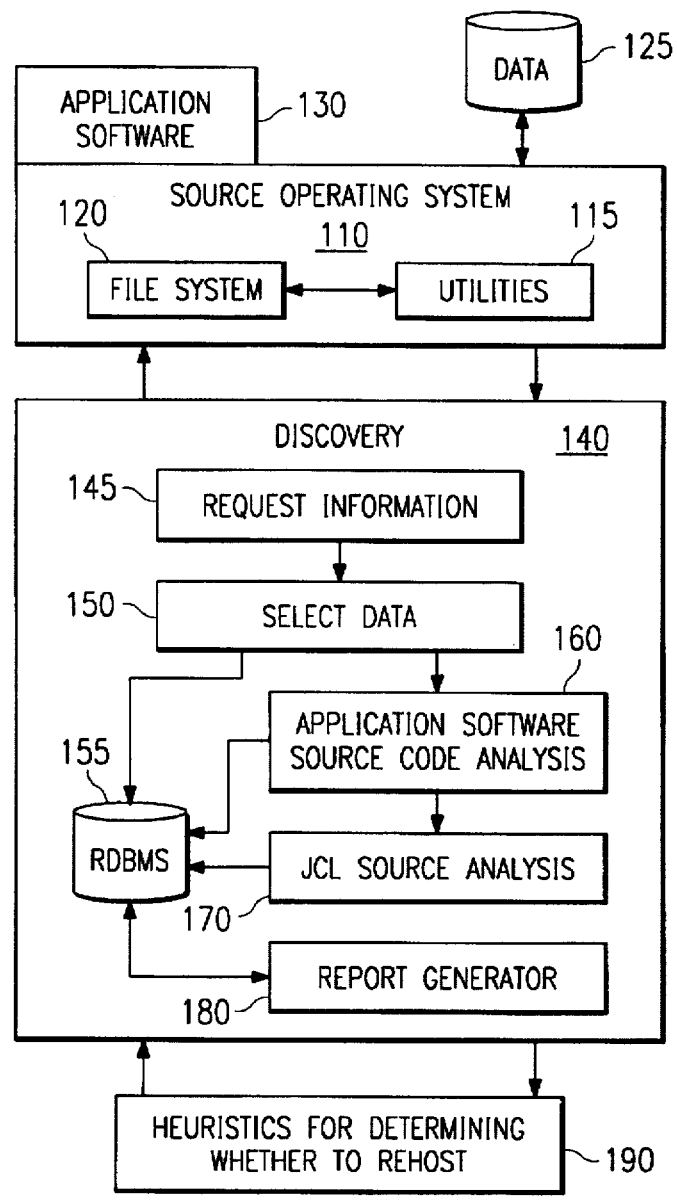
FIG. 1 is a block diagram illustrating an example embodiment of the discovery portion of the present invention together with an example operating system of a source computing environment.

As mentioned previously, rehosting is the process of migrating an existing software system from the source computer platform and environment on which it currently operates to a new targeted platform. Rehosting often requires conversion from one operating system to another in addition to the hardware change and the data files conversion. As discussed above, rehosting can go from any range source platform to a larger, smaller or even same size (with different capabilities) range target platform, depending on the needs of the particular organization.

For the sake of discussion and understanding of the present invention, an example migration from a source platform/environment to a target platform/environment will be described, namely: migration of a system comprising at least one software application in an IBM mainframe computer environment to a suitable mid-range computer operating under UNIX. In light of the above discussion, however, it should be understood that such description is only for illustration purposes and should in no way limit the present invention to only mainframe-to-mid-range rehosting. It should also be appreciated that specifically named IBM utilities have counterparts in non-IBM systems, and that the counterparts will be used by the system and method of the present invention where applicable when applied to a non-IBM system.

The present invention is probably best understood by artificially dividing it into three portions (also referred to hereinafter as "utilities"): a discovery portion, a migration portion, and a run-time services portion. The discovery portion of the present invention supports a process which is an information-gathering function. Its purpose in a rehosting effort is to ascertain and document all pertinent information about an application under consideration for rehosting, including the environment in which it presently operates.

This information is used to evaluate the suitability for rehosting of a specific candidate application to a designated target operating system. The information gathered by the discovery portion is also used during processing by the migration and run-time services portions.

The migration portion provides the means to rehost an application. In this process a computer application which resides on a source mainframe host computer is migrated to run on a selected target mid-range host computer, i.e., "rehosted". An application rehosted according to the present invention preferably remains unchanged, except for the actual hardware environment to which it has been migrated.

The run-time services portion is preferably at least one program which provides operational system support in the rehosted environment similar to that featured in mainframe computer environments. In the example system to be further considered below, some of the support features included as run-time services are Generation Data Group (GDG) administration, program and/or job submission and execution based on system return codes, file disposition processing and other production system monitoring activities.

Looking now at FIG. 1, which is a block diagram illustrating an example embodiment of the discovery portion of the present invention together with an example operating system of a source computing environment. Source operating system 110 includes utilities 115 and file system 120 and interacts with database 125 and at least one application software 130. It should be understood that the present invention will determine the number and requirements of each of such at least one application software 130 operating on any particular source operating system 110, convert and migrate such application software 130 to a target computing platform and support application software 130 in the new target host environment. The discovery portion of the present invention preferably describes the host system based on various analyses including CPU and storage device (disk, tape, etc.) analyses. It should be understood that the discovery portion of the present invention may certainly obtain more information about the source host system and/or the application software system to be ported that will be described hereinbelow, as such description is merely for illustration and not for purposes of limitation.

Discovery portion 140 of the present invention comprises requesting portion 145 which requests certain information from source operating system 110, any database(s) 125 and application software 130. Requesting portion 145 provides the results of its inquiries to data selector 150 for extraction of certain predetermined pieces of data therefrom. These pieces of data are stored in relational database management system ("RDBMS") 155. Source code analyzer 160 interacts with data selector 150 and RDBMS 155 to analyze the source code of each application software 130. The results of such analysis is also stored in RDBMS 155. Similarly, JCL source analyzer 170 interacts with RDBMS 155 to analyze the JCL source and store the results of such analysis in RDBMS 155. Report generator 180 generates any number of requested reports based on the results of discovery 140 stored in RDBMS 155.

Moreover, in another preferred embodiment of the present invention, heuristics 190 determine whether to rehost application software 130 based on the results of discovery 140 in view of the designated target computing environment. Such embodiment of the present invention would perform a rules-based analysis of the reports generated by report generator 180 to recommend the class of machine to use, and to suggested configuration, in the target computing environment.

Discovery 140 of the present invention preferably automates the process of inventorying and assessing customer systems. It analyzes existing systems to determine all resources used by, and processing requirements of, application software 130 when operating on a (source) mainframe, as in the current example. Results of the analysis can be used to: estimate the resources required on a target mid-range platform if the system is migrated; estimate the complexity of the programs and jobs by analyzing job history (e.g.: CPU time vs. overall elapsed time) and program attributes (e.g.: language, size), manage the system migration effort, etc.

FIG. 1 shows the relationship of discovery 140 to host operating system 110 according to a preferred embodiment of the present invention. Discovery 140 may reside on any computing platform such as a Windows-NT system, although a simple PC is sufficient. Information requestor 145 uses source host system utilities 115 to list the contents of the file catalog of host file system 120. With respect to the present example, in the MVS environment, the LISTCAT control statement directs the operation of an IBM utility known as IDCAMS to provide the requested output. As a result of this operation, source file system 120 provides information requestor 145 with all the names of the files used in host operating system 110. Information requestor 145 uses utilities 115 to also obtain a list of the catalog contents of the tape management system (not specifically shown).

These catalog listings which comprise a file information report are missing something important for rehosting, namely, the amount of space used by the associated files. To get the space requirements of each file, information requestor 145 runs a program against the file information report to generate a JCL job which is sent to host operating system 110. In the present example, the JCL job executes the IEHLIST utility on source host operating system 110 on the files. This job requests additional information from file system 120 concerning the actual volume where the data set resides (e.g., space utilization). From this operation, information requestor 145 obtains additional information on the files including space utilization information. Thus, the contents of the files (tape and non-tape) are brought to the PC from host machine including all the file names and all the volumes where each file is located. It should be understood that additional information could be obtained from the files (tape and non-tape) as desired.

Another source of information from source host operating system 110 is run time statistics. SMF records (System Management Facility records; not specifically shown) contain run time statistics on jobs that run on host operating system 110. Information requestor obtains selected predetermined information from the native SMF-type job accounting records. The native records are preferred so the results are independent of whichever job accounting system is used by source operating system 110. It should be understood that while using SMF records is appropriate in the IBM environment, comparable data is generally available in other environments, and those will be used where appropriate.

The catalog listings of the tape and non-tape files, together with space utilization and run time statistics, obtained by information requestor 145 is passed to data selector 150. Information such as CPU MIPS (by day, by type, by hour) and CPU Minutes (by day, by type, by hour for each job and step) is preferably extracted by data selection utility 150 from the information garnered by information requestor 145. While data selection utility 150 of the present invention is one preferably developed by the assignee of the present invention, Electronic Data Systems Corporation, examples of an off-the-shelf data selection utility which could be employed instead might include Monarch which is developed and sold by Personics, a Datawatch Company. Data selection utility 150 extracts specified information and puts all of the selected data into flat files which are in turn imported into RDBMS 155.

Another source of information for discovery 140 is application software 130 source code of the host system. This information is obtained by application software source code analysis utility 160. Source code analysis utility 160 preferably downloads the source to discovery 140 for analysis. For the following discussion, assume that the source is written in COBOL. It should be understood, of course, that the source code language could instead be FORTRAN, C, etc., and the actual language should in no way limit the scope of the present invention.

Figure 2:
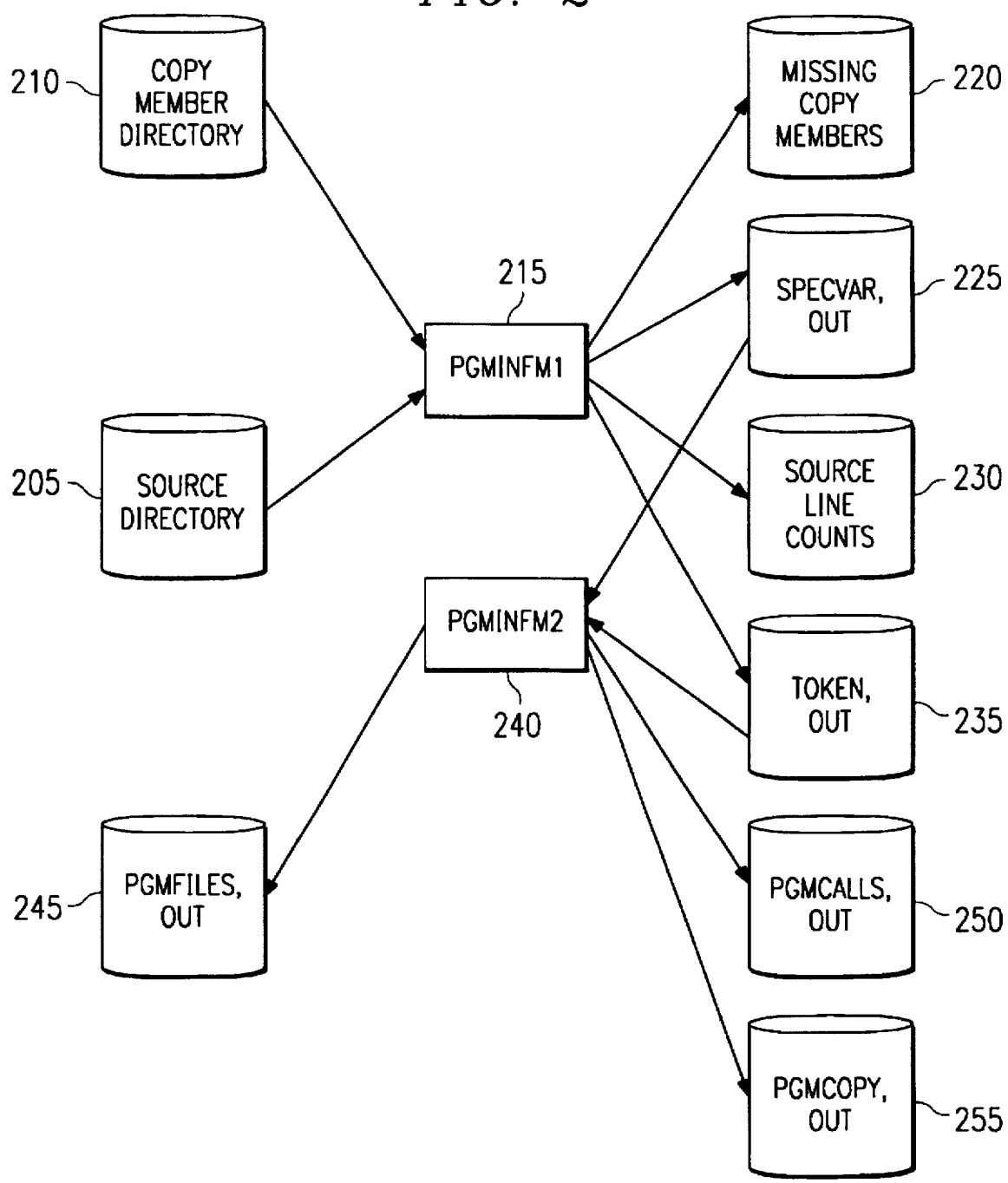
FIG. 2 is a block diagram illustrating the operating source code analysis performed by the discovery portion of the present invention.

Look now at FIG. 2, which is a block diagram illustrating the operating source code analysis performed by source code analysis utility 160. Discovery 140 preferably downloads the source code from source directory 205, including copy members from copy member directory 210, to PGMINFM1 215 of source code analysis utility 160 to begin detailed analysis. Copy members, in the present example, are parts of COBOL programs stored in separate files and brought together with the source when the program is compiled. Copy members can be code, file descriptors or any other part of a program.

PGMINFM1 215 handles the first portion of the source analysis process. It reads the input source file from source directory 205 and breaks the source into individual pieces or "tokens". Every word in the entire source code program under analysis is preferably parsed (broken down) into tokens, thereby making it much easier for source code analysis utility 160 to analyze the source code. Each token is preferably written to the output file, TOKEN.OUT 235, as a separate line. Therefore, every line in the TOKEN.OUT 235 file is a word from the program under analysis.

Yet another function of PGMINFM1 215 is to analyze the copy members. Inside the COBOL program currently under analysis, there may be a copy statement with a copy member name. At that point, PGMINFM1 215 brings in the copy member contents of copy member directory 210. As PGMINFM1 215 cycles through the source, every time that it finds a copy statement, but either cannot open the copy member or cannot find the copy member source, PGMINFM1 215 enters the occurrence in missing copy members file 220.

PGMINFM1 215 outputs any variables found within the program to SPECVAR.OUT 225, which is a file of special variables that will be needed later in the analysis. For example, assume the program currently under analysis calls program A but A is stored as a variable (perhaps "X"). PGMINFM1 215 sees a statement saying "call X", while it is progressing through the program. Since "X" is a variable, PGMINFM1 215 won't know the actual name of the program. To speed up processing, PGMINFM1 215 simply stores "X" in SPECVAR.OUT 225 to be used later by PGMINFM2 to resolve the variable ("X") name.

PGMINFM1 215 also ascertains whether the program under analysis is written in COBOL. In one embodiment of the present invention, if the program is not written in COBOL, for example it is written in FORTRAN, C, etc., PGMINFM1 215 subjects it to additional analysis based on the language in which it was written. Regardless of the language in which the program under analysis is written, PGMINFM1 215 records what the programming language is in SOURCE LINE COUNTS 230. Additionally, PGMINFM1 215 determines source line counts for the source code obtained from source directory 205. The number of comments, procedure lines, non-procedure lines, and total number of lines of code are counted and the respective numbers stored by PGMINFM1 215 in a file within SOURCE LINE COUNTS 230.

PGMINFM2 240 manages the second part of the source analysis process of source code analysis utility 160. It reads the source tokens file (TOKEN.OUT 235) produced by PGMINFM1 215, and outputs DD name, data set, and associated copy member into a cross reference file (PGMCOPY.OUT 255). PGMINFM2 240 also reads the contents of SPECVAR.OUT 225 and loads the special variables into a table; as it goes through working storage PGMINFM2 240 will resolve any program call cross-references corresponding to the designated variables. PGMINFM2 240 lists all of the sub-programs called by each program and stores the list in a file in PGMCALLS.OUT 250.

PGMINFM2 240 outputs, among other things, the program name, DD name, and any associated copy member name into PGMFILES.OUT 245. Every file in the present example COBOL program has a record—an 01 field. This record may be written from other variables. PGMINFM2 240 reviews the program under analysis to determine all the possible fields (structures) that describe each file in the host system. It should be understood that a file may be described by three or four file descriptors or record layouts. We need to know all the file descriptors that may possibly be describing a file which may have many record types. PGMINFM2 240 preferably captures the variables from which data is moved into any particular file under consideration to identify all the record descriptors that may possibly describe records in that file. For example, if we have a file being written from five variables, that information, including the copy member name that those variables are described in or declared in if they happen to be described in a copy member, is captured by PGMINFM2 240 and stored in PGMFILES.OUT 245. The information in PGMFILES.OUT 245 ties program files with file descriptors and copy members. It is also used to tie symbolic file names with actual file names.

Every source program 130 in the host system is retrieved from source directory 205 and run through both parts of the source code analysis utility 160 comprising PGMINFM1 215 and PGMINFM2 240 with the analysis results (data) reflecting useful information about the whole source code stored in each of the output files: MISSING COPY MEMBERS 220, SPECVAR.OUT 225, SOURCE LINE COUNTS 230, TOKEN.OUT 235, PGMFILES.OUT 245, PGMCALLS.OUT 250, and PGMCOPY.OUT 255. Once source copy analysis utility 160 has completed its analysis, JCL source analysis utility 170 takes control.

Figure 3:
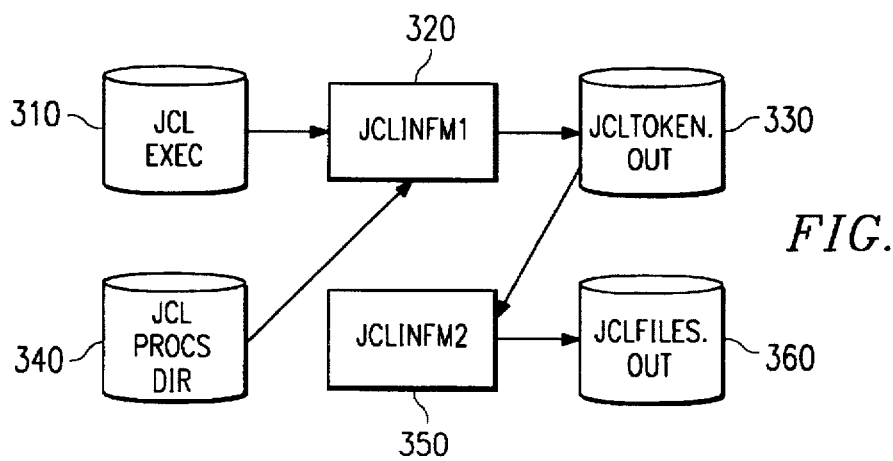
FIG. 3 is a block diagram illustrating the JCL source analysis performed by the discovery portion of the present invention.

Consider now FIG. 3, which is a block diagram illustrating the JCL source analysis performed by discovery 140 of the present invention. JCLINFM1 320 manages the first portion of the JCL source analysis. JCLINFM1 320 reads the exact execution JCL, including all expanded PROCs, and parses the entire JCL into tokens to make it easier for analysis. The resulting tokens are output by JCLINFM1 320 into a single file in JCL TOKEN.OUT 330. As JCLINFM1 320 finds a call (or an execution of a PROC by a job), it brings in the appropriate PROC source from JCL PROCS DIR 340. In other words every time a JCL statement which executes a PROC appears in the job, the PROC is read in from JCL PROCS DIR 340, parsed into tokens and written to JCLTOKEN.OUT 330. JCLINFM2 350 extracts information from JCLTOKEN.OUT 330 (job name, step name, DD name, actual file name and program name) and puts the extracted information into a file in JCL FILES.OUT 360.

PGMFILES.OUT 245 and JCLFILES.OUT 360 are imported into RDBMS 155. Report generator 180 can produce many types of reports based on the information in PGMFILES.OUT 245 and JCLFILES.OUT 360. The file names in PGMFILES.OUT 245 are preferably internal symbolic file names rather than actual file names. The actual file names are displayed in JCLFILES.OUT 360. The symbolic file names used in the programs under analysis are preferably tied to the actual file names via the DD name stored in both PGMFILES.OUT 245 and JCLFILES.OUT 360.

Before any file under consideration is migrated to the target environment, it is reviewed to see if there are any characters (any bytes) in the file that do not have a target environment equivalent. An example of such bytes may include data stored in non-displayable mode. Thus, such characters will need to be converted to a valid a target environment equivalent. Discovery 140 also checks the file descriptor (copy member) for such things as field definition clauses with COMP-3, COMP SYNC, or COMP headings. These headings indicate that the data contained in the file is packed or binary and it cannot be ported to a target environment without additional conversion.

From the contents of RDBMS 115, discovery 140 creates any number of database reports based on desired queries by using report generator 180. In another embodiment of the present invention, heuristics 190 (FIG. 1) determine whether to rehost based on the results contained in the customizable reports generated by report generator 180. Therefore, from these reports, a feasibility decision can be made to determine whether the system can be ported or not. For example, and not by way of limitation, such reports help users understand the costs and degree of complexity involved in a migration. They preferably provide information which would indicate that a given application is either not a candidate at all or a relatively poor candidate for rehosting (porting). By way of illustration, assume the present invention "discovers" that massive amounts of data are required to support an application (e.g., historical data continues to grow and purges of older data rarely (if ever) is scheduled to occur). Based on the reports generated, a recommendation may be made by the present invention that the data be kept on a mainframe as a data repository while the application itself be ported to a mid-range environment.

Another example might be a situation where an on-line mainframe system must be available for user access for most of a 24-hour day, perhaps from 6:00 a.m. to midnight. Assume a batch cycle must be completed following the close of the on-line system for the current day but prior to bringing the on-line system up for the next day's activity. The discovery portion of the present invention may determine that the "window" available for batch processing (when the on-line system is not running) is insufficient for the mid-range platform options which are otherwise cost effective for the application. In fact such condition(s) may warrant a recommendation to make run-time improvements to the application prior to any rehosting attempt, or data segmentation to allow multiple cycles to run, thereby effectively broadening the batch cycle.

A further illustration might be a case where the present invention "discovers" that the programs in the application to be rehosted consist of a mix of program languages, some of which cannot reasonably be converted by any means other than re-writing. In such a situation, the costs to rehost this application (including the time involved to accomplish the rehosting) could merit a recommendation that rehosting is not viable for the particular application.

The information contained in the reports generated by discovery 140 preferably assists organizations to determine the most cost effective platform configuration to purchase to support the application under consideration. Such reports also assist in determining the appropriate software tools needed and level of effort required for the transformation.

Following the analysis of application-specific data gathered by discovery 140, a candidate software application (or system) 130 will be judged as either suitable for rehosting or not suitable. When an application is deemed "not suitable" for rehosting, some other course of action (such as rewriting or reverse engineering) will be recommended. For those applications found suitable for rehosting, the next phase of the present invention begins.

Figure 4:
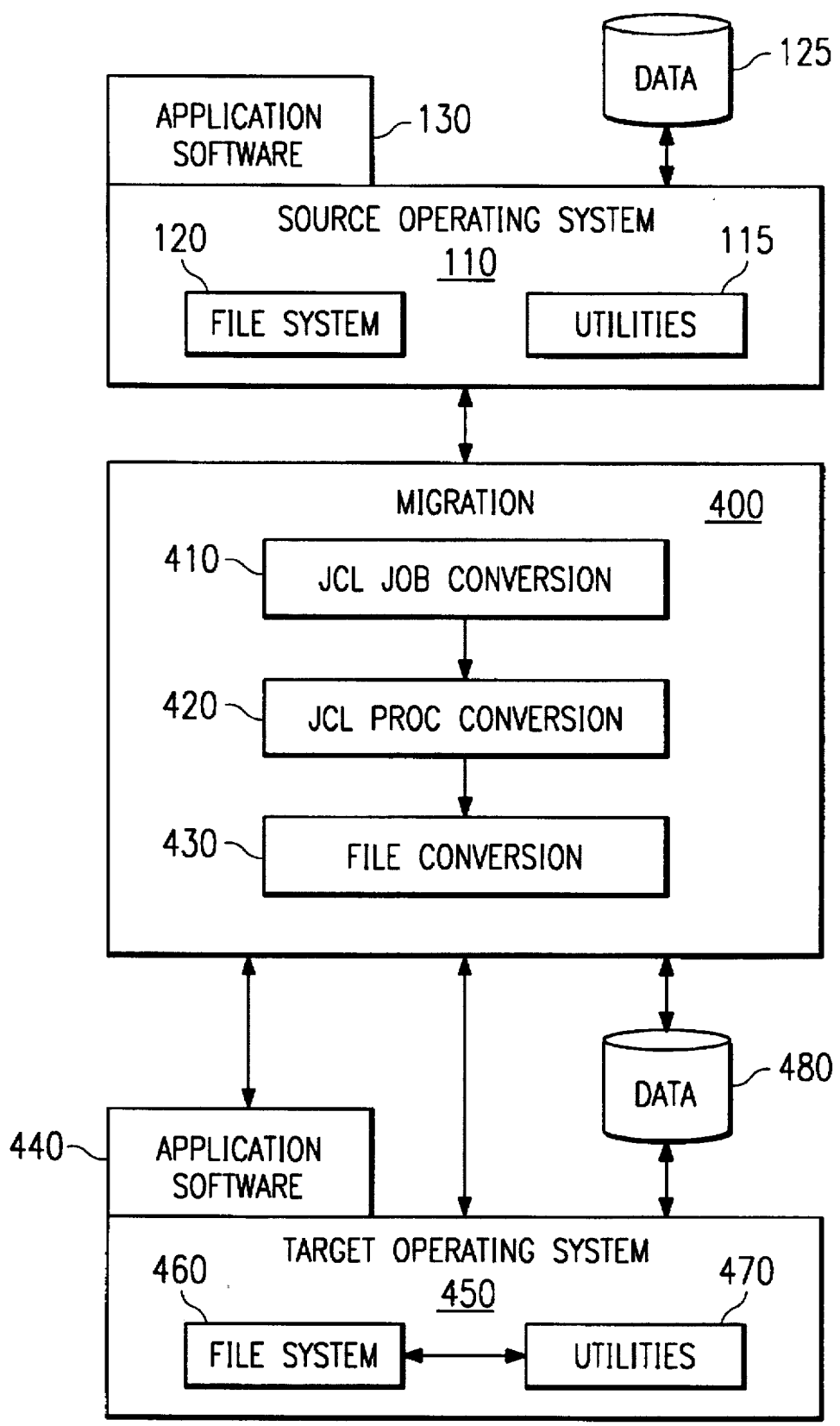
FIG. 4 is a block diagram illustrating the interactions between an example implementation of the migration portion of the present invention and the example operating systems for each of the source and target computing environments.

Look now at FIG. 4, which is a block diagram illustrating the interactions between an example implementation of the migration portion of the present invention and the example operating systems for each of the source and target computing environments. Migration 400 comprises JCL job conversion utility 410, JCL proc conversion utility 320, and file conversion utility 430.

Migration 400 preferably modifies the COBOL source code to optimize arithmetic calculations for the target platform. Programs 130 are then adapted by the present invention to compile and run in the UNIX environment. Migration 400 automatically converts all files and data elements from the formats used on source operating system 110 to the format requirements of target operating system 450. Control statements used for batch job submission and initiation are converted to perform in the rehosted environment. Application programs 130, while remaining functionally unchanged, are automatically converted to run in the new rehosted environment as a result of migration 400 of the present invention.

In the present working example, then, migration 400 manages the actual rehosting of the source software system components 130 from the mainframe (source operating system 110) to the mid-range UNIX (target operating system 450) environment. Migration 400 analyzes the data file formats and improves the storage parameters for data in sequential or indexed files by modifying the data files for optimized arithmetic calculations in the UNIX environment. Migration 400 also extracts data from existing mainframe file structures 125, converts the data for transmission, and reloads the data into UNIX file structures 480.

Specifically, with respect to the present example of rehosting from an IBM mainframe to a UNIX-based mid-range target host, migration 400 converts customer JCL into an interim rehosting language. JCL usage of common utilities is analyzed by migration 400, and then transformed into either standard UNIX programs or into functional equivalents or counterparts such as for job restart and iteration file set ("IFS") management. It should be understood that in light of the specific example illustration of the present invention discussed herein, for the IBM mainframe such IFS may herein-after be referred to as generation data groups ("GDG").

Figure 5:
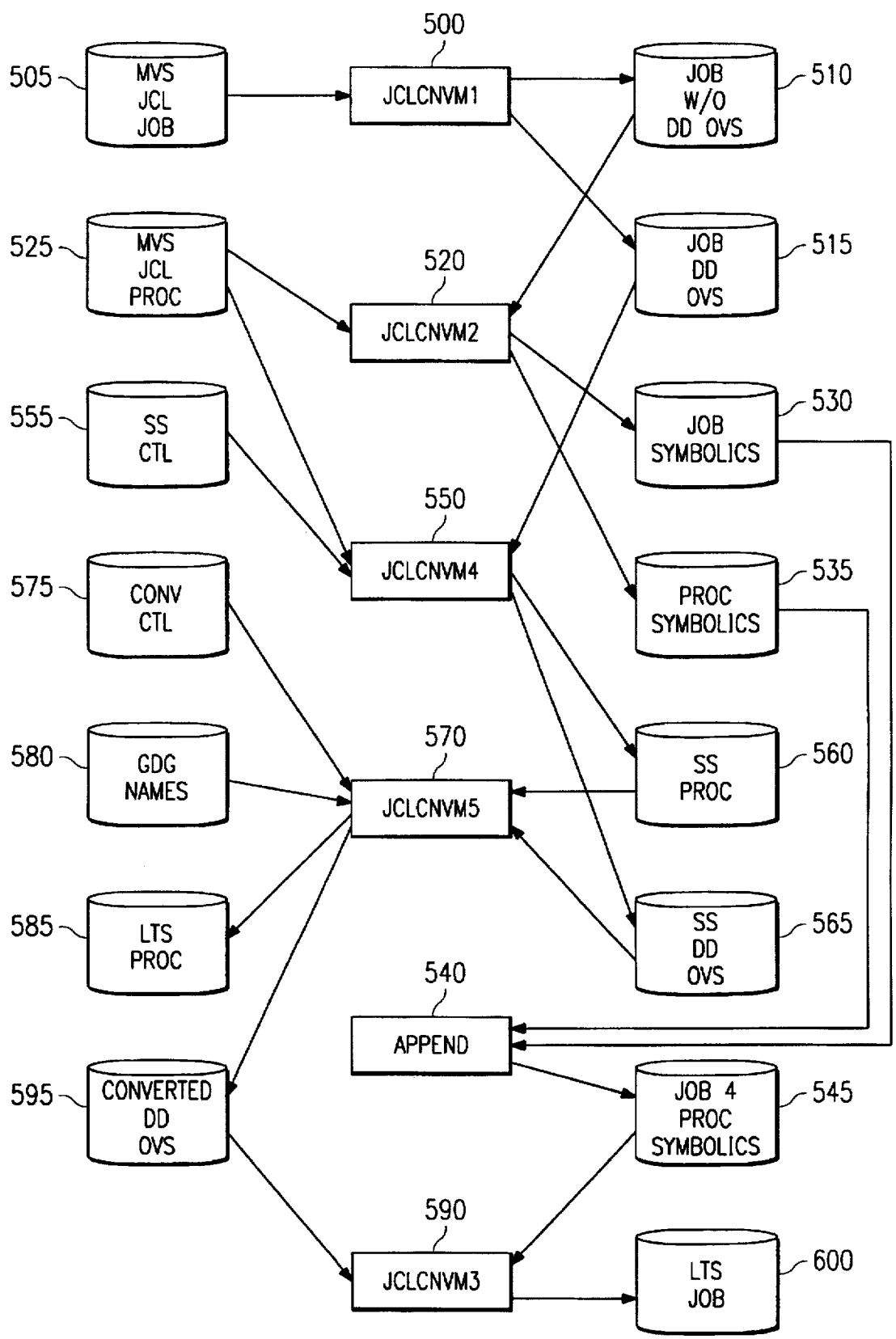
FIG. 5 is a block diagram illustrating the JCL job and JCL proc conversion processes performed by the migration portion of a preferred embodiment of the present invention.

Consider now FIG. 5 which is a block diagram illustrating the JCL job and JCL proc conversion processes to be performed by migration 400 in the present example rehosting. Migration 400 downloads all of the JCL jobs and all of the JCL procs for rehosting. For the sake of discussion, JCL job conversion utility 410 of migration 400 will be considered first.

JCLCNVM1 500, which is the first part of JCL job conversion utility 410, obtains all of the JCL jobs from MVS JCL JOB 505. JCLCNVM1 500 divides each JCL job into two files. Any DDs or overrides are extracted and stored in a file in JOB DD OVS 515, while everything else is placed into JOB W/O DD OVS 510 ("job without DD overrides"). Next JCLCNVM2 520 retrieves the contents of the file from JOB W/O DD OVS 510. JCLCNVM2 520 extracts the job symbolics and stores them in a file in JOB SYMBOLIC 530. JCLCNVM2 520 also extracts the proc symbolics from the JCL job to be converted and stores them in a file in PROC SYMBOLICS 535. The contents of JOB SYMBOLICS 530 and PROC SYMBOLICS 535 are then combined into a single file by APPEND 540 and stored in JOB & PROC SYMBOLICS 545. The combination is preferably accomplished so that the job symbolics take precedence over the proc symbolics.

Before the contents of the file in Job DD overrides 515 can be converted, JCLCNVM4 550 preferably applies string substitutions to the Job DD overrides by employing control statements obtained from string substitution control file 555. These control statements (or records) direct JCLCNVM4 550 to replace whatever string is on the left side of each control statement with whatever string is found on the right side of the same control statement whenever the left-side string is found in the Job DD overrides 515 file. For example, if there is a control statement which says 'SYSOUT'='/JOB/SYSOUT', every time JCLCNVM4 550 finds 'SYSOUT' in the file in JOB DD OVERRIDES 515 it globally replaces 'SYSOUT' with '/JOB/SYSOUT' and stores the results in SS DD OVS 565.

At this point JCL job conversion utility 410 is ready to do the actual JCL job conversion. JCLCNVM5 570 inputs a conversion control file from CONV CTL 575 and a control file from GDG NAMES 580. The GDG NAMES 580 control file enables JCLCNVM5 to identify a GDG name file type as it comes across one. The CONV CTL 575 control file causes all DD names to be prefixed by 'DD_', determines what the lowest return code that will be considered an abend will be, and shows the program how to identify a VSAM file. An example file might be:

DDPFIX=DD_,
LABEND=13
VSAMTYPE=??????VS.,
LOGPATH=/USR/OAN/TEST/SYSLOG/,
PGMSPATH=/USR/OAN/TEST/BIN/,
TEMPPATH=/USR/OAN/TEST/TMP/,
LTSPATH=/USR/OAN/TEST/UTILS/,
VSAMPATH=/USR/OAN/TEST/VSAM/,
GDGPATH=/USR/OAN/TEST/GDG/,
SEQPATH=/USR/OAN/TEST/SEQ/,
SYSOUT=/USR/OAN/TEST/SYSOUT/,
RUNPATH=/USR/OAN/TEST/RUN/,

The first line above causes all DD names to be prefixed by 'DD_', while the second line indicates that the lowest return code that will be considered an abend in the target system is 13. The third line shows the program how to identify a VSAM file (the '?' will match any character in those positions). The remaining lines above are example paths used to build file names in the UNIX environment. Every control line is preferably terminated with a comma.

JCLCNVM5 570 then converts the string substituted job DD overrides based on the directions contained in the control files and outputs the results into a file in CONVERTED DD OVS 595. By converting the DD overrides, a DD overrides facility can be provided in the batch processing facility of the run time services portion of the present invention. JCLCNVM3 590 combines the converted DD override JCL with the JOB and PROC symbolics to create an LTS job which is stored in LTS JOB 600. It should be understood that the LTS job would be the target host operating system's equivalent of the original (source) execution JCL—in the present rehosting scenario, the LTS job thus created would be a UNIX equivalent of the original execution JCL.

Control then passes from JCL job conversion utility 410 to JCL proc conversion utility 420. JCLCNVM4 550 inputs a string substitution control file from SS CTL 555 and all of the JCL procs from NVS JCL PROC 525. As with the JCL jobs, JCLCNVM4 550 performs string substitution on the JCL procs as directed by the string substitution control file. The resulting string-substituted proc is stored at SS PROC 560. JCLCNVM5 570 takes as input a conversion control file from CONV CTL 575, the table of GDG names from GDG NAMES 580, and the string-substituted proc from SS PROC 560. JCLCNVM5 570 converts the string-substituted proc into an LTS proc, and stores the resulting output at LTS PROC 585.

At this point in migration 400, file conversion preferably can take place. Consider now FIGS. 6a–b which are block diagrams illustrating the file conversion process performed by migration 400 of a preferred embodiment of the present invention. Such conversion process is preferably performed within the source environment of operating system 110 or, alternatively, in a emulation of such source environment located on another platform such as a PC. For every file identified as containing bytes that cannot be moved into the target environment without conversion (discussed above in connection with discovery utility 140, file conversion utility 430 generates a conversion program (shown as FIG. 6a) to convert the file.

Figure 6A:
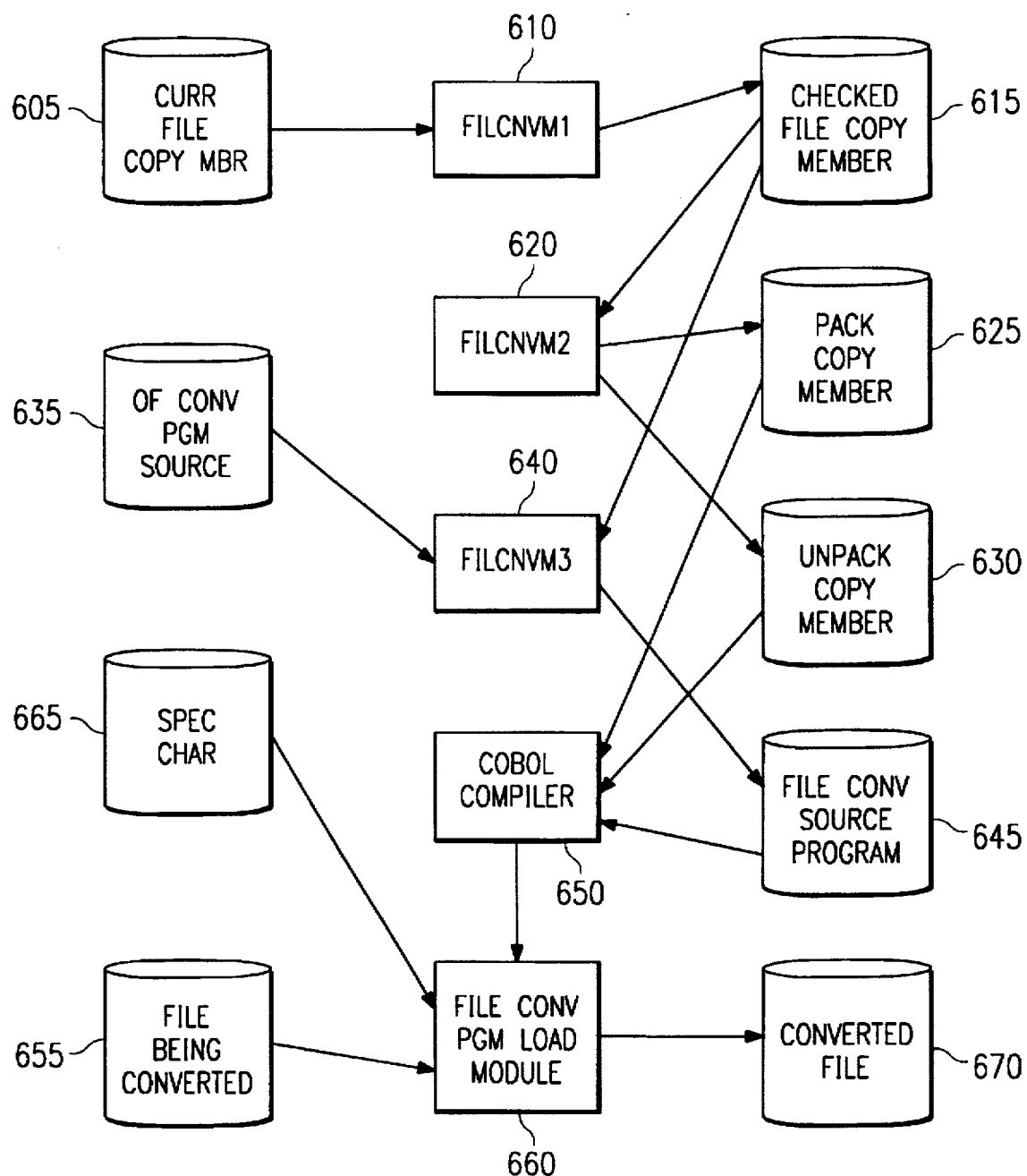
FIGS. 6a-b are block diagrams illustrating the file conversion process performed by the migration portion of a preferred embodiment of the present invention.

Looking now at FIG. 6a, FILCNVM1 610 reads a copy member, which in the present example is in COBOL. It preferably checks the copy member for errors (such as missing periods at the end of statements, missing or invalid field levels within a record description, missing/required picture clauses, etc.) and, optionally, renames filler fields. The resulting checked copy member is produced by FILCNVM1 610 as an intermediate output file stored in CHECKED FILE COPY MEMBER 615. Any errors are preferably flagged and an error message may be optionally output by FILCNVM1 610.

Next FILCNVM2 620 reads the output of FILCNVM1 610 and produces two copy member (file descriptor) files: one describing the file as it is (hereinafter referred to as the "packed copy member 625"), and one describing the file as it is to look before it is moved to the target environment (hereinafter referred to as the "unpacked copy member 630"), in this case UNIX. Of course it will be understood that the target environment could be DOS, Windows NT, etc. instead. FILCNVM2 620 checks that the copy member from CHECKED FILE COPY MEMBER 615 has an 01 level; if so, it renames the 01 level field names by appending a "–P" to the end of the 01 name for packed copy member 625 and a "–U" to the end of the 01 name for unpacked copy member 630. In the event FILCNVM2 discovers a file which has no 01 level, it preferably issues an error message and stops further processing. As will be seen below, these two copy members 625, 630 become part of the file conversion program for data movement between environments.

Once FILCNVM2 620 has generated pack copy member 625 and unpack copy member 630, FILCNVM3 640 reads in checked file copy member 615 and a Set 'S' file (not shown) which contains the standard set of characters which are common to both the source environment and the target environment, located in conversion program source 635. Set 'S' preferably contains all the letters of the alphabet, both upper and lower case character codes, the numbers 1 through 9, the space character, and the plus and minus signs. These characters are common to virtually all computers and translation can normally be assured on a character for character basis regardless of source or target environment. Other characters may be converted but they must be dealt with in a more specific non-standard conversion algorithm. Conversion program source 635 preferably contains the top portion of the conversion program source to be used for every conversion program because it is generally the same for every file to be converted. From these inputs, FILCNVM3 640 creates file conversion source program 645 for the file described by the copy member under consideration. A move statement is generated for every field with a picture clause. FILCNVM3 640 is driven by parameters. FILCNVM3 640 can preferably handle one-, two- and three-dimensional tables. An example of a parameter description for FILCNVM3 640 might be 'CCCCCC.,W,KF,' where the letters are alphanumeric characters. 'CCCCCC.' in the above example is the packed copy book name followed by a period. This parameter may preferably be up to 9 characters long. If W='K' (for "keyed") the select statement for packed file in the generated program will describe a VSAM file. 'KF'(for "key field") may preferably be up to 30 characters long. All parameters are terminated with a comma.

Once file conversion source program 645 is generated by FILCNVM3, it is compiled by compiler 650. The contents of pack copy member 625 and unpack copy member 630 are brought in at compile time and combined with file conversion source program 645. The compiled results are file conversion program load module 660. Load module 660 receives the contents of a special character control file 665 which preferably contains a list of special characters, not contained in Set 'S' that are to be accepted by the conversion process (i.e., accepted characters are carried forward from the source file and appear in the converted file). Most characters have similar or identical meaning from one computer environment to another. The primary examples of these are preferably included in the Set 'S' file. Beyond such basic set of characters there is another group of characters (which can vary from environment to environment) which should receive the same treatment as the basic set. According to the present invention, although the file which contains this variable character set is preferably a different file from the Set 'S' file, it is treated by the present invention as though it were an addition or extension of the Set 'S ' file. Nevertheless, the characters represented in the two files (Set 'S ' and Special Characters File) combined, do not always represent the entire character set from either the source environment or the target environment. Thus, any character encountered in the source file which is not included in the Set 'S ' file or the Special Characters File will not be accepted and is preferably replaced by a space character in the post conversion file.

Conversion program load module 660 is run against file 655 to be converted, resulting in a converted file 670 which can now be moved to the target platform without the data being corrupted. The logical record length of the contents of converted file 670 has been expanded. Failing to unpack (expand) packed copy members (compressed data) results in corrupted data in target environment. To do a file conversion before the present invention, one either changed the data manually on the file or wrote a program to do each of the conversions. With the present invention, the user does not need to write conversion programs—each conversion program is generated automatically and stored as file conversion source program 645. In the past, when an organization or "user" wanted to convert data files from one environment to another, it was necessary for them to write a unique (tailored) and separate conversion program for virtually every file involved in the environment move. This could amount to literally hundreds of programs in a large legacy system and the expense involved would be quite high. However, the present invention preferably converts fields of data into a nonpacked format by enlarging the respective field(s) so that all data is represented in "character format" (i.e., "one byte" per character). "Packed" data usually puts 2 digits (numeric data) into one byte. The net result of processing a file according to the present invention is an "interim" converted file which is usually significantly larger (physically longer records) than the input file. However, the data formatting is far more simplistic within this "interim" file. By focusing on conversions from a "data field" viewpoint, rather than at the entire file level, a conversion program can be automatically generated for a specific file by programmatically examining the source statements (file descriptions). A field conversion routine can be invoked as often as called for by the file description, modified according to the needs of each specific field and linked into one executable module per file. The result is a unique program per file without requiring a person to code it uniquely for each file, as has previously been required in most conversion activities.

Figure 6B:
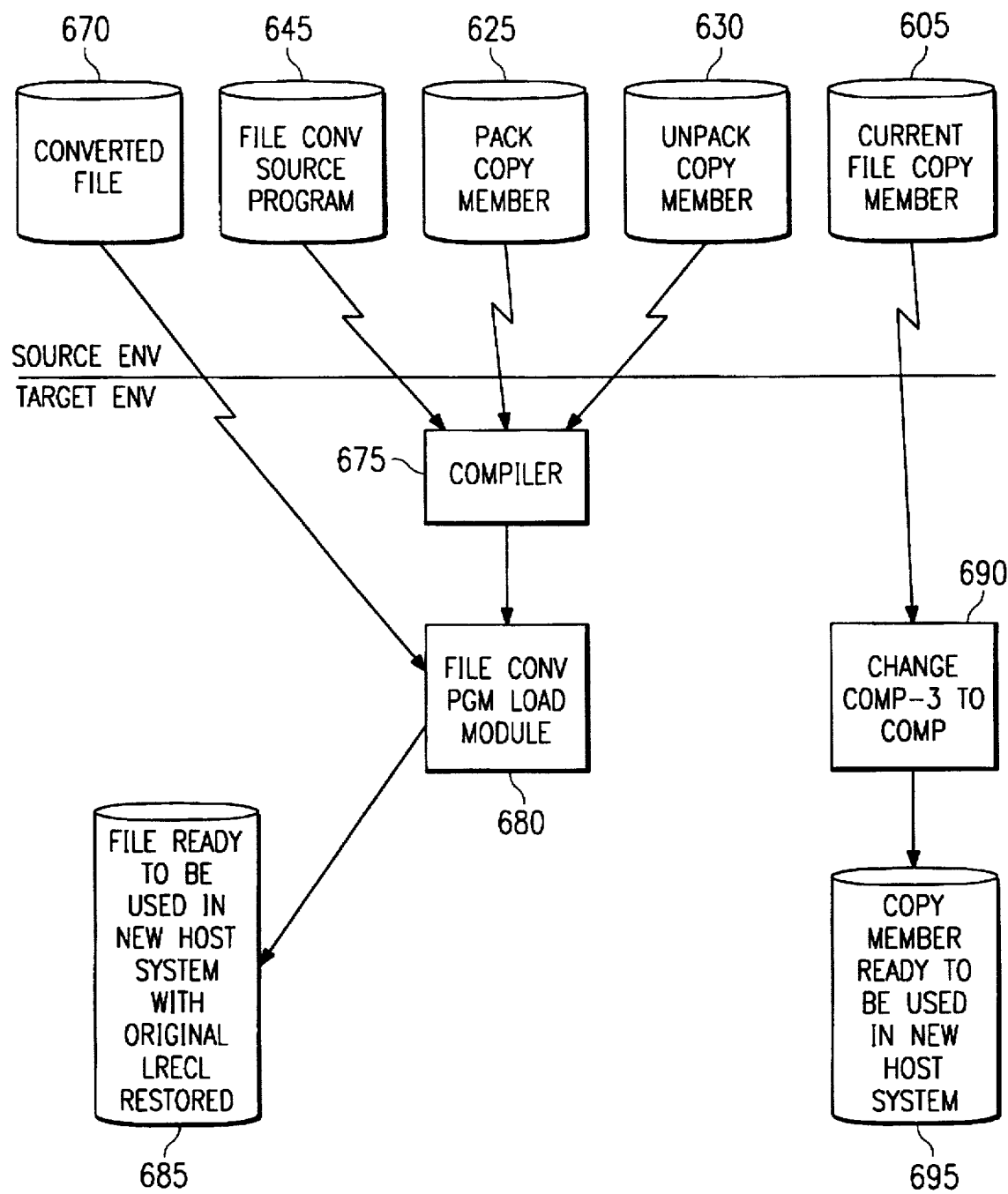

Looking now at FIG. 6b, converted file 675, file conversion source program 645, pack copy member 625, expanded or unpacked copy member 630 and the current (or original) file copy member (file descriptor) 605 which were generated in the process illustrated in FIG. 6a, are migrated from the source environment to the target environment. In the UNIX (or DOS) environment, file conversion 430 of the present invention compiles the conversion program again with compiler 675, resulting in file conversion program load module 680 in the target environment. Load module 680 repacks converted file 675 to its original file format in the new environment, resulting in a file ready to be used in the new host system with the original logical record length restored.

Optionally, when file conversion utility 430 repacks the file, it preferably has the option (not required) to change the format of the fields (for example in the present illustration COMP-3s to COMPs (block 690), since COMPs are more efficient in UNIX than COMP-3s). Once this change has occurred, the data is then recompressed. Thus, copy member 695 is ready to be used in the (target) new host system.

After migration 400 has completed its work, run time services 700 takes over to complete the rehosting and, for the present example, continue to provide mainframestyle batch processing in the mid-range (UNIX) environment. Such functionality includes, but is not limited to: iterative file set handling (GDG handling in the current example), JCL overrides, job step restart, data set disposition control, temporary data sets, condition code analysis and control, etc. It should be recalled that the present invention is not limited to rehosting from mainframe to mid-range environment illustrated herein. Thus, if the source operating system from which the software is migrated does not require iterative file set handling, then the present invention will create an equivalent of such iterative file set(s) for improved functionality once the migrated software has been rehosted.

Figure 7:
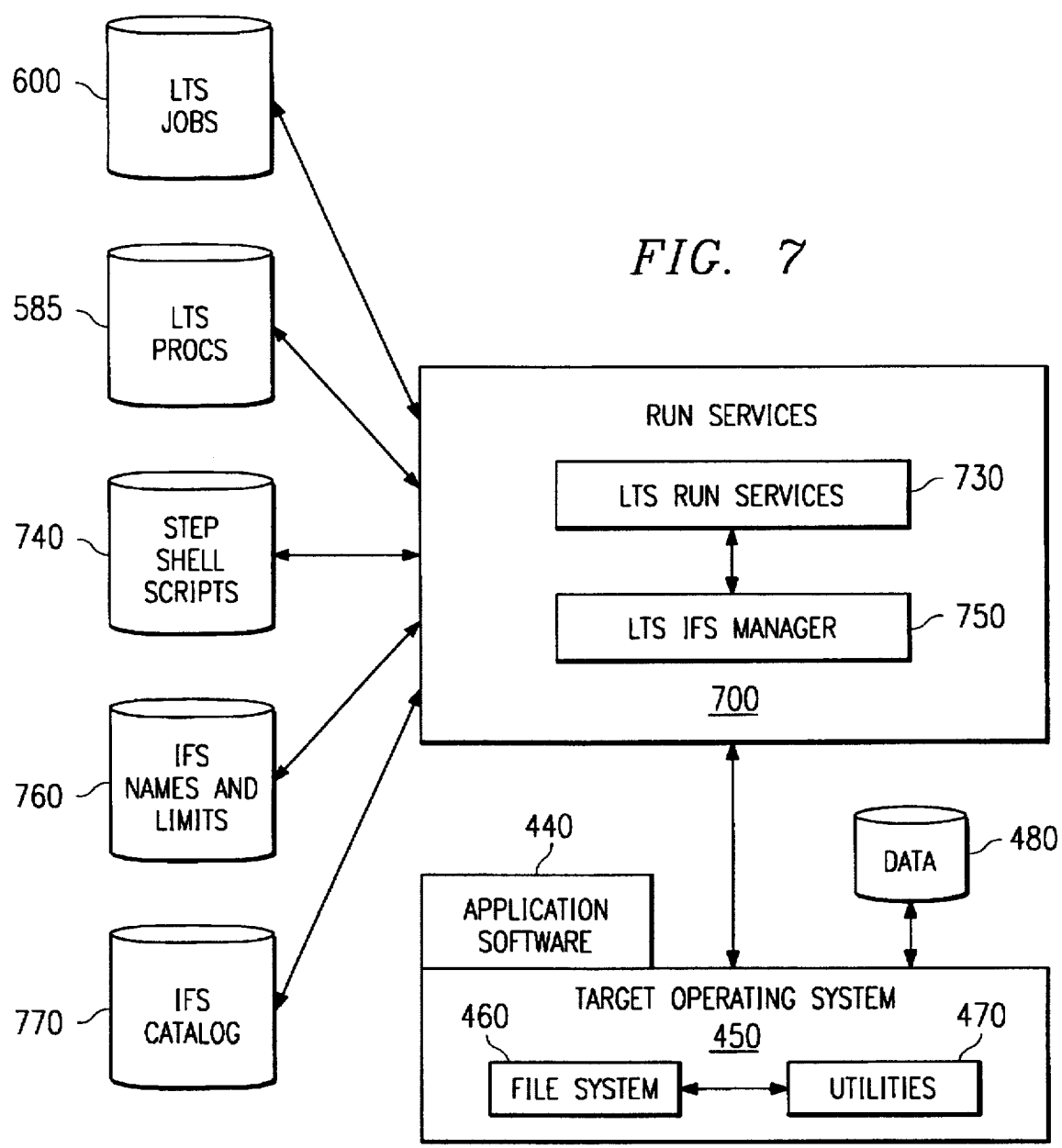
FIG. 7 is a block diagram illustrating the run-time services process performed by a preferred embodiment of the present invention.

The batch facility run services interpreter of run time services 700 executes the converted compiled programs, including LTS JOB 600 and LTS PROC 585 generated by migration 400 and creates execution scripts 740 in the new (target) host environment. Looking now at FIG. 7, which is a block diagram illustrating an example relationship between run time services 700 and target source environment 450. Run time services facility 700 includes LTS run services utility 730 and LTS iterative file set (generation) manager utility 750, herein-after referred to as IFS manager utility 750.

Run time services 700 preferably provides the same level and type of functionality in the new targeted environment that had previously been supported or provided by the operating system of the source environment. Specifically in the present example, run time services 700 preferably provides, for an application rehosted to the target environment, the functionality normally associated with the host environment, such as disposition handling, IFS (in the present example, GDG) handling and condition code processing in a mid-range environment, in this case UNIX. It is part of the permanent implementation of the target environment and is an integral tool in controlling and managing the environment.

IFS manager utility 750 receives a list of files from IFS names and limits 760. The contents of names and limits file 760, obtained by LISTCAT during discovery 140 and extracted as a report from RDBMS 155, were renamed during migration 400 preferably by replacing the periods that separate the file name nodes on the mainframe with slashes (e.g., forward slash for UNIX, backward slash for DOS) and including the generation limit.

IFS manager utility 750 is the IFS file type manager. It is part of the base information stored for each iterative file set and can be invoked by a user or by LTS run services 730. IFS manager utility 750 creates IFS entries, adds and deletes IFS files, allows changing the limit of an IFS, reports on the contents of IFS catalog 770, etc.

The following examples of parameters passed to IFS manager utility 750 by LTS run services 730 (or a user) will illustrate some of the IFS manager utility 750's functionality. The number of parameters passed to IFS manager utility 750 preferably vary on the function request. The function desired is preferably written as the first parameter.

Example: LT SIFM GR ADDIFS/OAN/TEST/FILEA 5 where 'ADDIFS' is the function requested, '/OAN/TEST/FILEA' is the file name of the IFS, and '5' is the generation limit. The effect of such a request is that IFS manager utility 750 adds an IFS with a generation limit of 5 and creates a file named "oan/test/filea.0".

Example: LTSIFM GR ADDFIL/OAN/TEST/FILEA+1 where 'ADDFIL' is the function requested, 'OAN/TEST/FILEA' is the file name of the IFS, and '+1' is the relative generation number. The effect of this request is that IFS manager utility 750 creates a file entitled "oan/test/filea.00001"

Example: LTSIFMGR ADDFIL /OAN/TEST/FILEA +1 where 'ADDFIL' is the function requested, 'OAN/TEST/FILEA' is the file name of the IFS, and '+1' is the generation number. The effect of this request, when provided after the immediately preceding example, is that IFS manager utility 750 creates a more recent (generational) file entitled "/OAN/TEST/FILEA.00002".

Example: LTSIFMGR DELFIL /OAN/TEST/FILEA +0 where 'DELFIL' is the function requested, '/OAN/TEST/FILEA' is the file name of the IFS, and '0' is the generation number. This request deletes file "oan/test/filea.00002".

Example: LTSIFMGR CHGLIMIT /OAN/TEST/FILEA 3 where 'CHGLIMIT' is the function requested, '/OAN/TEST/FILEA' is the file name of the IFS, and '3' is the generation limit. This request directs IFS manager utility 750 to change the limit of the specified IFS to 3 and delete any existing generations that now fall outside the new established limit (range), if any.

Example: LTSIFMGR DELIFS /OAN/TEST/FILEA where 'DELIFS' is the function requested, and '/OAN/TEST/FILEA' is the file name of the IFS. IFS manager utility 750 deletes the identified IFS, including all of its associated generation files as a result of this request.

Once IFS manager utility 750 has obtained all of the IFS names from IFS names and limits file 760, it creates all the corresponding IFS bases, including any needed subdirectories. An IFS base is an IFS file with a .0 generation which is ready for additional generations. IFS manager utility 750 is then ready to act as an administrative tool to manage the IFS files based on requests it receives directly from LTS run services 730 or even interactively with a user of target operating system 450.

Once IFS manager utility 750 has generated the IFS bases required, including any other generations which a user may have added, LTS run services 730 can now run a job. To accomplish this, LTS run services utility 730 is invoked, either manually from the command line or automatically from a job scheduler. In either case, the job name is passed as a parameter. At runtime, LTS run services 730 converts the interim rehosting language into execution scripts. The resulting scripts exceed standard UNIX for control of multiple step batch jobs.

Specifically, after loading the job and checking it for syntax errors, LTS run services 730 loads the PROC from LTS PROC 585 and checks it for syntax errors. For each IFS used in the PROC, the latest generation number is obtained from IFS manager utility 750. This generation number will serve as the basis from which to determine all other relative generation numbers of a given IFS type file used anywhere in the PROC. If there is a restart step, LTS run services 730 will then preferably begin generating internal execution scripts 740 at that particular step; otherwise it will start generating internal execution scripts 740 for each step in the PROC beginning at the top.

Each step execution script 740 is provided to target operating system 450 (for the present illustration of IBM mainframe to UNIX mid-range platforms) by LTS run services 730. Target operating system 450 then preferably executes execution script 740 which writes the return code to a file pre-defined by LTS run services 730.

LTS run services 730 preferably builds each step execution script 740 in such a way that it knows in which specific file the step return code is going to be stored. LTS run services 730 then reads that specified file to determine the step return code. LTS run services 730 repeats this process for every step in the job by constantly polling the step file and preferably storing the return code for every step in a table. LTS run services 730 will use this table during execution of the job to determine whether a step ABENDed and whether any next step containing a condition code is to be executed. Specifically, each condition code is interpreted against condition codes of any previous step or of a specific previous step stored in the built table. Additionally, LTS run services 730 writes messages out to a job log, which could be a file or target operating system 450 log.

Some of the environment variables preferably control the behavior of LTS run services 730. For example, one variable reflects the lowest ABEND which in turn directs LTS run services 730 to interpret designated codes as abnormal termination codes for a particular step. Another environment variable directs LTS run services 730 where to write log messages. Examples of environment variables might include:

Example: LABEND=NN where NN is the lowest return code considered an abend

Example: RUNWORK=X2 where X2 is the name of a directory where LTS run services 730 creates work files Execution script 740 for each step preferably includes setting the environment variables for files, which enables the target operating system to tie the program to its associated external file name. Those environment variables are defined in the source system programs (e.g., DD names on a mainframe). An example execution script 740 will set environment variable equals filename, export the environment variable, followed by the invocation of the program, and then the capture of the return code.

It should be understood by those skilled in the art that the present description is provided only by way of illustrative example and should in no manner be construed to limit the invention as described herein. Numerous modifications and alternate embodiments of the invention will occur to those skilled in the art. Accordingly, it is intended that the invention be limited only in terms of the following claims:

We claim:

1. A system for automated assessment of at least one software application for rehosting from a source computing environment to a predetermined target computing environment, comprising:
    a computer processor having a discovery utility requesting predetermined information from source computing environment operating system, any databases in said source computing environment,and said at least one software application, and analyzing said predetermined information to assess feasibility of rehosting said at least one software application from said source computing environment to said target computing environment; and
    a relational database management system receiving and storing said predetermined information and results of said analyzing from said discovery utility.

2. The system for automated assessment of claim 1, further comprising a migration utility residing on said computer processor receiving said predetermined information and results of said analyzing from said relational database management system and rehosting said at least one software application to said target computing environment based on said predetermined information and results of said analyzing.

3. The system for automated assessment of claim 2, further comprising a run-time services utility residing on said computer processor providing operational system support within said target computing environment similar to operational system support available on said source computing environment.

4. The system for automated assessment of claim 3, wherein said operational system support includes iterative file set administration.

5. The system for automated assessment of claim 3, wherein said operational system support includes file disposition processing.

6. The system for automated assessment of claim 3, wherein said operational system support includes job submission and execution based on system return codes.

7. The system for automated assessment of claim 2, wherein said migration utility rehosts said at least one software application such that functionality of said at least one software application on said target computing environment remains unchanged from said functionality of said at least one software application on said source computing environment.

8. The system for automated assessment of claim 1, further comprising a report generator generating predetermined reports describing said source computing environment and said at least one software application based on said predetermined information and analysis results stored in said relational database management system.

9. The system for automated assessment of claim 1, further comprising a JCL source analyzer interacting with said relational database management system to analyze JCL source and storing results of such analysis in said relational database management system.

10. The system for automated assessment of claim 1, wherein said predetermined information includes information describing said source computing environment based on results from CPU and storage device analyses.

11. The system for automated assessment of claim 1, wherein said source computing environment is a mainframe computer.

12. The system for automated assessment of claim 1, wherein said target computing environment is a mid-range computer.

13. The system for automated assessment of claim 1, wherein said discovery utility further comprises heuristics interacting with said relational database management system to assess whether to rehost application software based on said results of said analysis stored in said relational database management system in view of said predetermined target computing environment.

14. A system for automated rehosting of at least one software system from a source computing environment to a predetermined target computing environment, comprising:
    a discovery utility performing an assessment of said at least one software system and said source computing environment, and generating a description of said at least one software system and said source computing environment;
    a migration utility receiving said assessment and said description from said discovery utility and rehosting said at least one software application to said target computing environment based on such assessment and description; and
    a run-time services utility providing operational system support for said at least one source software system within said target computing environment similar to operational system support previously available on said source computing environment based on said assessment and said description.

15. The system for automated rehosting of at least one software system of claim 14, further comprising a relational database management system receiving and storing said assessment and said description from said discovery utility, and providing said assessment and said description to said migration utility and said run-time services utility.

16. The system for automated rehosting of at least one software system of claim 14, further comprising a report generator generating predetermined reports describing said source computing environment and said at least one software application based on said assessment and said description stored in said relational database management system.

17. The system for automated rehosting of at least one software system of claim 15, further comprising a JCL source analyzer interacting with said relational database management system to analyze JCL source and storing results of such analysis in said relational database management system.

18. The system for automated rehosting of at least one software system of claim 14, wherein said assessment includes information describing said source computing environment based on results from CPU and storage device analyses.

19. The system for automated rehosting of at least one software system of claim 14, wherein said source computing environment is a mainframe computer.

20. The system for automated rehosting of at least one software system of claim 14, wherein said target computing environment is a mid-range computer.

21. The system for automated rehosting of at least one software system of claim 14, wherein said operational system support includes iterative file set administration.

22. The system for automated rehosting of at least one software system of claim 14, wherein said operational system support includes file disposition processing.

23. The system for automated rehosting of at least one software system of claim 14, wherein said operational system support includes job submission and execution based on system return codes.

24. The system for automated rehosting of at least one software system of claim 14, wherein said migration utility rehosts said at least one software application such that functionality of said at least one software application on said target computing environment remains unchanged from said functionality of said at least one software application on said source computing environment.

25. A system for automated rehosting of at least one software system from a source computing environment to a target computing environment, comprising:
    a computer processor having a migration utility rehosting at least one job, at least one proc and at least one file of said software system to said target computing environment and converting job control language of said source computing environment into an interim rehosting language; and
    a run-time services utility residing on said computer processor generating execution scripts from said interim rehosting language.

26. The system for automated rehosting of at least one software system of claim 25, wherein said run-time services utility provides post-migration services within said target computing environment comparable to those services formerly available within said source computing environment.

27. The system for automated rehosting of at least one software system of claim 25, wherein said system further comprises a discovery utility residing on said computer processor obtaining predetermined information from source computing environment and said at least one software system, and analyzing said predetermined information to assess feasibility of rehosting said at least one software system from said source computing environment to said target computing environment.

28. The system for automated rehosting of claim 25, wherein said source computing environment is a mainframe computer.

29. The system for automated rehosting of claim 25, wherein said target computing environment is a mid-range computing processor.

30. The system for automated rehosting of claim 26, wherein said post-migration services include iterative file set administration.

31. The system for automated rehosting of claim 26, wherein said post-migration services include file disposition processing.

32. The system for automated rehosting of claim 26, wherein said post-migration services include job submission and execution based on system return codes.

33. A method for automatic file conversion for files to be migrated from a source computing platform to a target computing platform, comprising:
    accessing a file to be converted;
    programmatically examining at least one file description within said file;
    generating a conversion program for each of said file descriptions; and
    linking each conversion program into one executable module per file for generating conversion program course code for said file, without requiring a person to write a unique program for each said file to be converted.

34. The method for automatic file conversion of claim 33, further comprising the step of enlarging each field within said file based on said file description before said step of generating.

35. A method for automated assessment of at least one software application for rehosting from a source computing environment to a predetermined target computing environment, comprising the steps of:
    obtaining predetermined information from source computing environment operating system, any databases in said source computing environment, and said at least one software application;
    analyzing said predetermined information to assess feasibility of rehosting said at least one software application from said source computing environment to said target computing environment; and
    storing said predetermined information and results of said analyzing from a discovery utility in a relational database management system.

36. The method for automated assessment of claim 35, further comprising the steps of:
    receiving said predetermined information and said results of analysis from said relational database management system; and
    rehosting said at least one software application to said target computing environment based on such assessment and description.

37. The method for automated assessment of claim 36, further comprising the steps of:
    providing operational system support within said target computing environment similar to operational system support available on said source computing environment.

38. The method for automated assessment of claim 37, wherein said operational system support includes iterative file set administration.

39. The method for automated assessment of claim 37, wherein said operational system support includes file disposition processing.

40. The method for automated assessment of claim 37, wherein said operational system support includes job submission and execution based on system return codes.

41. The method for automated assessment of claim 35, wherein said step of rehosting further comprises the step of rehosting said at least one software application such that functionality of said at least one software application on said target computing environment remains unchanged from said functionality of said at least one software application on said source computing environment.

42. The method for automated assessment of claim 35, further comprising the step of generating predetermined reports describing said source computing environment and said at least one software application based on said predetermined information and analysis results stored in said relational database management system.

43. The method for automated assessment of claim 35, further comprising the steps of:
  analyzing any JCL source; and
  storing results of such analysis in said relational database management system.

44. The method for automated assessment of claim 35, wherein said step of obtaining predetermined information further comprises the step of analyzing said source computing environment's CPU and storage devices.

45. The method for automated assessment of claim 35, wherein said step of analyzing said predetermined information further comprises the step of employing heuristics to assess whether to rehost application software based on said results of said analysis stored in said relational database management system in view of said predetermined target computing environment.

46. A method for automated rehosting of at least one software system from a source computing environment to a predetermined target computing environment, comprising the steps:
  performing an assessment of said at least one software system and said source computing environment;
  generating a description of said at least one software system and said source computing environment based on said assessment;
  rehosting said at least one software application to said target computing environment based on such assessment and description; and
  providing operational system support for said at least one source software system within said target computing environment similar to operational system support previously available on said source computing environment based on said assessment and said description.

47. The method for automated rehosting of at least one software system of claim 46, further comprising the step of generating predetermined reports describing said source computing environment and said at least one software application based on said assessment and said description.

48. The method for automated rehosting of at least one software system of claim 46, further comprising the steps of analyzing JCL source and storing results of such analysis in a relational database management system.

49. The method for automated rehosting of at least one software system of claim 46, wherein said step of performing an assessment further comprises the step of analyzing said source computing environment CPU and storage device.

50. The method for automated rehosting of at least one software system of claim 46, wherein said operational system support includes iterative file set administration.

51. The method for automated rehosting of at least one software system of claim 46, wherein said operational system support includes file disposition processing.

52. The method for automated rehosting of at least one software system of claim 46, wherein said operational system support includes job submission and execution based on system return codes.

53. The method for automated rehosting of at least one software system of claim 46, wherein said step of rehosting further comprises the step of rehosting said at least one software application such that functionality of said at least one software application on said target computing environment remains unchanged from said functionality of said at least one software application on said source computing environment.

* * * * *